(No Model.)

C. HALL.
Extra Seat for Carriages.

No. 236,428.                    Patented Jan. 11, 1881.

Witnesses
Wendell R. Curtis
Henry Hammond

Inventor
Charles Hall
by Theo. G. Ellis, Atty

UNITED STATES PATENT OFFICE.

CHARLES HALL, OF MARLBOROUGH, CONNECTICUT.

EXTRA SEAT FOR CARRIAGES.

SPECIFICATION forming part of Letters Patent No. 236,428, dated January 11, 1881.

Application filed October 25, 1880. (No model.)

*To all whom it may concern:*

Be it known that I, CHARLES HALL, of Marlborough, in the county of Hartford and State of Connecticut, have invented certain new and useful Improvements in Extra Seats for Carriages; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to an additional seat for temporary use with buggies or other carriages having a seat only sufficiently wide to accommodate two persons, whereby a third person can be accommodated without inconvenience.

Carriages have heretofore been provided with a small seat projecting from the seat of the carriage on the same or a lower level, such seats being for temporary use for a third person; but their use has been inconvenient, as the space occupied interferes with the position of the persons sitting at the sides, and the person sitting on the extra seat ordinarily has not sufficient room to extend his legs, but is obliged to sit in a cramped position inconvenient for driving.

The object of my invention is to provide an extra seat which shall avoid the inconveniences of the seats now in use.

Figure 1:
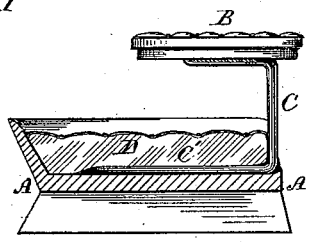
Figure 2:
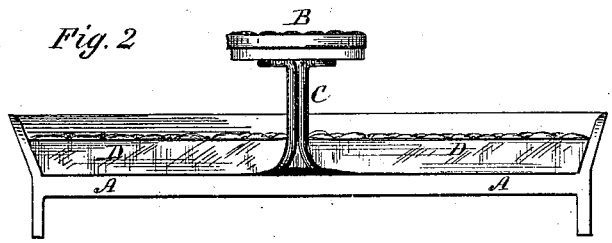
Figure 3:
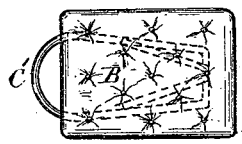

In the accompanying drawings, illustrating my invention, Figure 1 shows a side view of my improved seat with a section through the ordinary seat of a carriage. Fig. 2 is a front view of my improved extra seat and the ordinary seat with which it is intended to be used. Fig. 3 is a top view of my improved extra seat detached.

A is the ordinary seat of a buggy or other carriage. B is the top part of my improved extra seat. C is a leg or support attached to the top B, and, passing downward in front of the cushion D of the seat A, is bent backward so as to lie between the seat A and its cushion D. The part of this support which lies upon the seat A is spread out into the form of a loop, C', so as to give a wide base and firm bearing for the seat supported by it, and is contracted to a simple upright stem above the cushion, so as not to interfere with the legs of the persons seated at the sides. The seat B is raised in this manner sufficiently high above the cushion D to permit of the legs of the occupants passing freely under the part B, and they sit in the ordinary position without being incommoded by the extra seat. The seat B also, being above the legs of those occupying the ordinary seat, can be placed farther back than is otherwise possible, and thereby gives ample room to the person using it, and, being higher up, is more convenient for the driver.

The extra seat, when not in use, can be easily slipped out and placed under the ordinary seat, or in any other convenient place out of sight.

What I claim as my invention is—

A seat composed of the top B and support C, said support having a narrow upright portion, C, and a broad horizontal base, C', adapted to be used with an ordinary carriage-seat and be held and supported between the seat and cushion, substantially as described.

CHARLES HALL.

Witnesses:
  WENDELL R. CURTIS,
  THEO. G. ELLIS.